Jan. 4, 1955 R. K. WEAVER ET AL 2,698,623
HAIR CURLER

Filed July 11, 1950 3 Sheets-Sheet 1

INVENTORS
Ruth K. Weaver
Paul T. Hahn
By
Gary, Desmond & Parker
ATTYS.

Jan. 4, 1955 — R. K. WEAVER ET AL — 2,698,623
HAIR CURLER
Filed July 11, 1950 — 3 Sheets-Sheet 2

INVENTORS
Ruth K. Weaver
Paul T. Hahn
By Gary, Desmond & Parker
ATTYS

Jan. 4, 1955 R. K. WEAVER ET AL 2,698,623
HAIR CURLER

Filed July 11, 1950 3 Sheets-Sheet 3

INVENTORS
Ruth K. Weaver
Paul T. Hahn
BY Gary, Desmond & Parker
ATTORNEYS

United States Patent Office 2,698,623
Patented Jan. 4, 1955

2,698,623

HAIR CURLER

Ruth K. Weaver and Paul T. Hahn, Chicago, Ill., assignors to Gaylord Products, Incorporated, Chicago, Ill., a corporation of Delaware Application July 11, 1950, Serial No. 173,184

6 Claims. (Cl. 132—34)

This invention relates to hair curlers and is more particularly concerned with the provision of a curler adapted for use in forming pin curls.

In the hair dressing art the term "pin curl" is applied to a relatively small lock of hair wound into spiral form and secured in a flat condition against the scalp by means of hair pins or clips, the axis of the curl being disposed in a plane normal to the scalp. In giving a permanent wave to hair by means of a cold wave solution, it has heretofore been a common practice to saturate the hair with the cold wave solution and then wind the hair about a curler having its axis parallel with the scalp. A neutralizing solution is then applied to the curl of hair on the curler; after which, the curl is removed from the curler and rinsed in clear warm water to remove the cold wave solution and neutralizer. The wet hair is then arranged in the form of pin curls which are secured in position by hair pins or clips until dry.

It is an object of the present invention to reduce the amount of time and labor heretofore required in forming pin curls, by providing a curler adapted to eliminate the operation of forming and securing the pin curls after the cold wave solution and neutralizer have been rinsed from the hair.

It is a further object of this invention to provide a curler on which a lock of hair may be wound, waved, neutralized, rinsed and dried to form pin curls prior to removal of the curler from the hair.

It is a further object of this invention to provide a curler on which a lock of hair may be wound either from the scalp end toward its free end or from the free end toward the scalp.

It is another object of this invention to provide a curler adapted to be inexpensively formed from plastic, rubber or metal and which may readily be applied to the hair with or without the assistance of a hair dresser.

This invention further contemplates the provision of a hair curler which may, if desired, be expanded to stretch a lock of hair wound thereon.

This invention embodies other novel features, details of construction and arrangement of parts which are hereinafter set forth in the specification and claims, and illustrated in the accompanying drawings, wherein:

Figure 1:
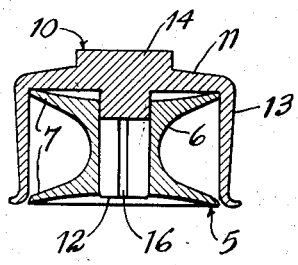
Fig. 1 is a transverse sectional view illustrating a hair curler embodying features of the present invention.
Figure 4:
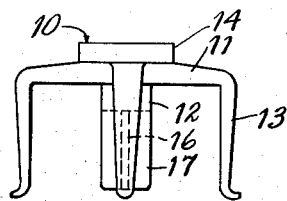
Fig. 4 is a side elevational view illustrating the curler locking cap.
Figure 2:
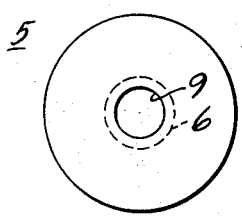
Fig. 2 is a plan view showing the curler body.
Figure 5:
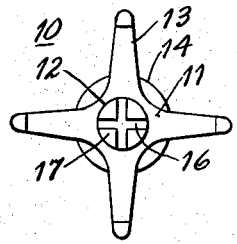
Fig. 5 is a bottom plan view of same.
Figure 3:
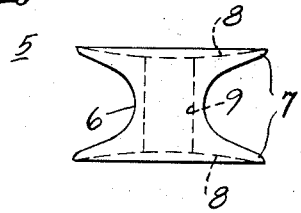
Fig. 3 is a side elevational view of same.

Referring now to the drawings for a better understanding of this invention, and more particularly to Figs. 1 to 5 therein, the hair curler is shown as comprising a body 5 formed with an annular hair receiving recess 6 and circular end flanges 7—7. The end walls of the body are preferably formed concave at 8—8 to substantially conform to the contour of the scalp of a user. The body is also formed with a central aperture 9 extending axially through the end walls.

A locking cap 10 is provided for the body 6 and comprises a wall 11 formed with a depending central stem 12 and four depending resilient fingers 13, the fingers being spaced 90° apart about the axis of the stem and projecting parallel with and slightly beyond the stem to hold a curl of hair within the recess 7 of the body 6. The free ends of the fingers 13 are formed to diverge outwardly to facilitate mounting of the cap over the body 6. A flat protuberance 14 is provided on the outer surface of the wall 11 for engagement by the fingers of the user in removing the locking cap 10 from the body 6. If desired, the protuberance 14 may be formed to present an ornamental appearance. The stem 12 is slotted inwardly from its free end at 16 to provide four resilient portions 17 adapted to frictionally engage the cylindrical surface defining the central aperture 9 formed in the body 6.

In the use of the hair curler for making pin curls, a lock of hair is wound around the curler body 5 with the axis of the curl disposed in a plane normal to the scalp and with either of the concave end surfaces 8—8 disposed against the scalp, as illustrated in Fig. 1. It will be noted that a lock of hair may be wound on the curler body 5 by starting the winding operation from either the scalp end or the free end of the hair. The curl is secured within the recess 6 of the body 5 by mounting the cap 10 on the body, with the resilient fingers 13 projecting across the flanges 7—7. By slotting the free end of the stem 12, the stem is divided into portions 17 having sufficient resiliency to provide a snug frictional engagement with the cylindrical wall defining the aperture 9.

After a lock of hair has been wound around the curler body 5 and locked in position by the cap 10, it is saturated with a cold wave solution, neutralized, rinsed and then dried; after which the curler is removed from the curl by first removing the cap and then removing the curler body. The cap and body forming the curler are preferably molded from a thermoplastic material to decrease the weight and cost of manufacture and to enhance the ornamental appearance, but it is apparent that the curler parts may be formed from metal, rubber or other materials, if desired. It may also be found desirable to provide the cap 10 with a different number of fingers 13 to engage a curl against displacement from the body 5.

Figure 6:
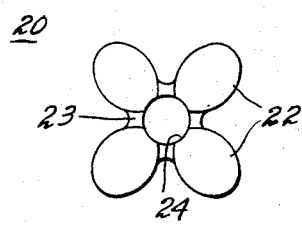
Fig. 6 is a plan view illustrating a modified form of curler body.
Figure 7:
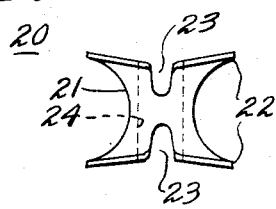
Fig. 7 is a side elevational view of same.

Figs. 6 and 7 in the drawings illustrate a modified form of curler body 20 formed with an annular recess 21 to receive a wound lock of hair, each end of the body being formed with a plurality of radially disposed legs 22 and transverse grooves 23. The body is also provided with a central aperture 24 to receive the stem 12 of the cap 10 heretofore described in connection with Figs. 4 and 5 in the drawings. In this form of the invention, the body is formed to permit liquids or air to pass directly to all portions of a curl disposed within the recess 21.

Figure 8:
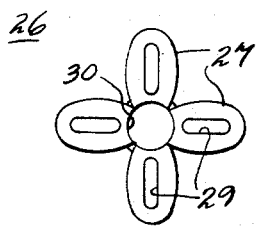
Fig. 8 is a plan view illustrating another modified form of curler body.
Figure 9:
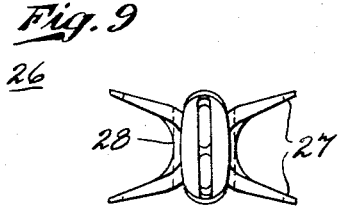
Fig. 9 is a side elevational view of same.
Figure 13:
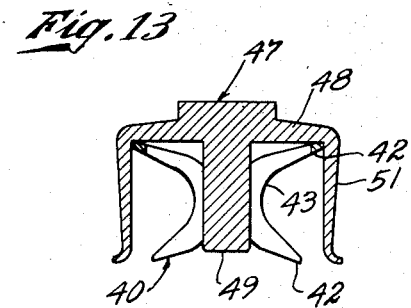
Fig. 13 is a transverse sectional view illustrating a modified form of hair curler in which the body member is adapted to be expanded to stretch the hair wound thereon.
Figure 16:
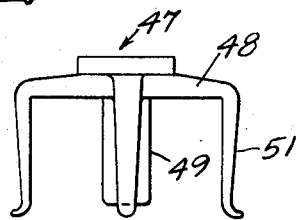
Fig. 16 is a side elevational view illustrating the locking cap shown in Fig. 13.

Figs. 8 and 9 in the drawings illustrate another modified form of this invention wherein the curler body 26 comprises a plurality of U-shaped legs 27 having their medial portions joined together to define an annular recess 28 to receive a wound lock of hair, the legs being formed with slots 29 for the passage of air or liquids. The body is formed with a central aperture 30 to receive the stem 12 of the locking cap 10.

Figure 10:
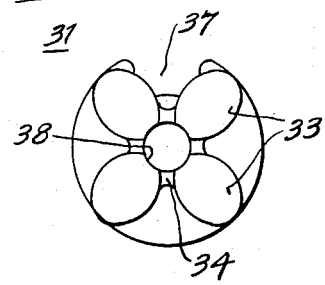
Fig. 10 is a top plan view illustrating another modified form of curler body.
Figure 11:
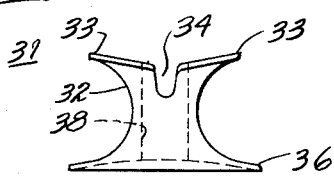
Fig. 11 is a side elevational view of same.
Figure 12:
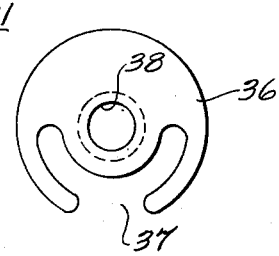
Fig. 12 is a bottom plan view of same.

Figs. 10, 11 and 12 illustrate another modified form of curler body 31 formed with an annular recess 32 to receive a wound strand of hair. The upper end of the body is provided with a plurality of radially disposed legs 33 and transverse grooves 34, and the lower end of the body is formed with a circular flange 36 formed with a Y-shape opening 37 to receive the root end of a lock of hair prior to winding the latter about the curler body. An aperture 38 extends through the body to receive the stem 12 of the locking cap 10.

Figure 14:
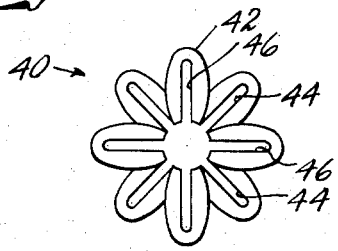
Fig. 14 is a plan view illustrating the curler body shown in Fig. 13.
Figure 17:
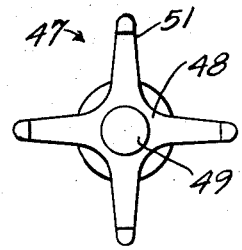
Fig. 17 is a bottom plan view of same.
Figure 15:
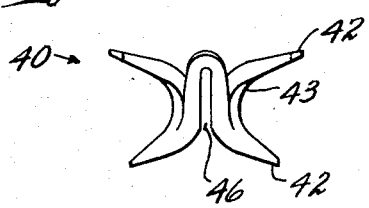
Fig. 15 is a side elevational view of same.

Figs. 13, 14, 15, 16 and 17 illustrate another modified form of hair curler comprising a body 40 formed with a central aperture 41 and provided at its ends with a plurality of radially disposed legs 42 to define an annular recess 43 to receive a wound lock of hair. A plurality of slots 44 extend from one end of the body and terminate adjacent the ends of the legs 42 at the other end of the body. Another group of slots 46 extend from the other end of the body in the opposite direction from the slots 44 and terminate adjacent the ends of the legs at the opposite end of the body. As shown in Figs. 14 and 15, the body is thus formed with two sets of radially disposed slots which are adapted to permit the medial portion of the body to be expanded or contracted.

A locking cap 47 is provided for the body 41 and is shown as comprising a wall 48 provided with a depending stem 49 and depending fingers 51. After a lock of hair has been wound around the curler body 40, the stem 49 is inserted into the aperture 41 to expand the body and thus stretch the hair.

Figure 19:
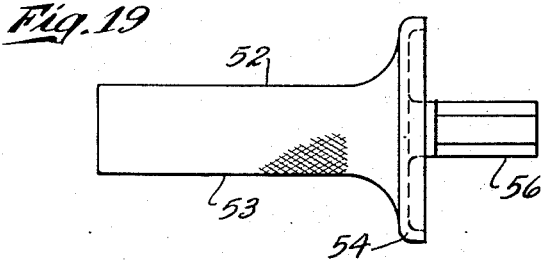
Fig. 19 is a side elevational view illustrating a handle which may be employed for rotating the curler body illustrated in Figs. 13, 14 and 15 in winding a lock of hair around the body.
Figure 20:
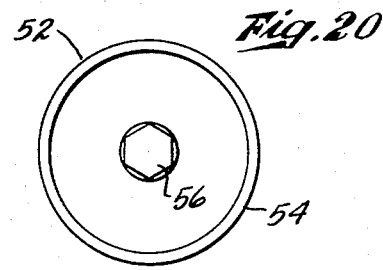
Fig. 20 is an end elevational view of same.

A plug type handle 52, of the type illustrated in Figs. 19 and 20, may be employed to rotate the curler body 40 in winding a lock of hair thereon. The handle is shown as comprising a knurled hand-gripping portion 53 formed with a circular flange 54 and a plug portion 56 of hexagonal cross section, the plug portion being formed for insertion into the central aperture 41 of the curler body 40.

Figure 21:
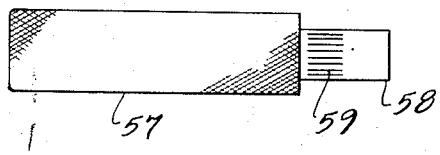
Fig. 21 is a side elevational view illustrating a modified form of handle adapted for use in rotating non-expandable curler bodies.
Figure 22:
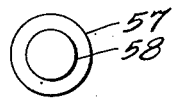
Fig. 22 is an end elevational view of same.

Figs. 21 and 22 illustrate a plug type handle 57 adapted for use in manually rotating the non-expandible curler bodies heretofore described, the handle being provided with a small diameter end portion 58 formed on its surface with longitudinally extending ridges and grooves 59 to snugly engage the wall surface defining the central apertures in the curler bodies.

Figure 18:
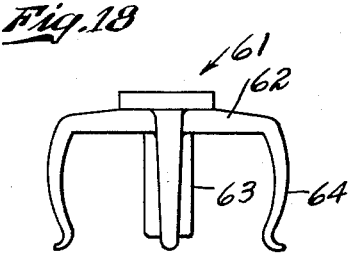
Fig. 18 is a side elevational view showing another modified form of locking cap.

Fig. 18 illustrates a modified form of locking cap 61 comprising a wall 62 formed with a depending stem 63 and a plurality of depending arcuate fingers 64, the fingers being bowed outwardly from the stem to receive and engage a lock of hair wound on a curler body.

In forming pin curls by the use of each of the several forms of hair curlers herein shown and described, a lock of hair is wound around the curler body and secured in position thereon by means of a locking cap. The wound lock of hair is then saturated with a cold wave solution, neutralized, rinsed, dried and then removed from the curler. It will be noted that the curler bodies and locking caps are preferably molded from thermoplastic, thermosetting plastic, rubber or the like to provide a spider-like structure defining numerous passageways through which liquids and air are free to travel during the formation of pin curls.

With the exception of the type of curler body shown in Figs. 10, 11 and 12, the several curler bodies are formed with similar ends to permit either end to be engaged against the scalp of the user, and also to permit winding of a lock of hair from its scalp or root end toward its free end or from its free end toward the scalp. After a lock of hair has been wound around the curler body shown in Figs. 13, 14 and 15, it will be noted that the body is expanded to stretch the hair by inserting the locking cap stem 49 into the aperture 41.

While this invention has been shown in several forms, it is obvious to those skilled in the art that it is not so limited but is susceptible of various changes and modifications without departing from the spirit and scope of the claimed invention.

We claim as our invention:

1. In a hair curler, a spool-shaped body formed with an annular recess to receive a lock of hair wound thereon, said body having an axial bore extending therethrough, at least one end of said body being formed concave to conform to the contour of a user's scalp, a locking cap comprising a base engaged against one end of said curler body, a stem depending from said base for non-rotatable frictional engagement against the wall defining said axial bore, and a plurality of fingers depending from said base at spaced intervals about said body to hold a wound lock of hair against displacement from said body, at least one end of said body being formed with radially disposed legs, said legs being formed with slots for the passage of liquid and air to a lock of hair wound on said body, said body being formed with longitudinally extending slots to provide expansion of the body during insertion of said locking cap stem.

2. In a hair curler, a spool-shaped body formed with an annular hair receiving recess, a plurality of radially disposed legs provided at each end of said body, said body having an axial bore, a locking cap having a base for engagement against one end of said body, a stem depending from said base and frictionally engaged in said bore, and a plurality of fingers depending from said base at spaced intervals about said body to prevent displacement of a lock of hair wound around said body, said body being slotted longitudinally throughout the major portion of its length to cause the body to expand during insertion of the locking cap stem into said axial bore.

3. In a hair curler, a spool-shaped body formed with an annular hair receiving recess, a plurality of radially disposed legs provided at each end of said body, said body having an axial bore, a locking cap having a base for engagement against one end of said body, a stem depending from said base and frictionally engaged in said bore, a plurality of fingers depending from said base at spaced intervals about said body to prevent displacement of a lock of hair wound around said body, said body being slotted longitudinally throughout the major portion of its length to cause the body to expand during insertion of the locking cap stem into said axial bore, some of said slots extending inwardly from one end of said body, and intermediate slots extending inwardly from the other end of said body.

4. In a hair curler, a spool-shape body member of greater diameter than length having an axial cylindrical bore extending therethrough and an annular peripheral recess located approximately on the transverse center line of the body member, a locking cap telescopically engageable over either end of said body member comprising a base engaging one end of said body member, a cylindrical stem member depending from said base for snug frictional engagement within either end of said bore, one of said members being formed of resilient material and slotted to conform to the diameter of the other member during assembly of the locking cap on the body member, and a plurality of fingers circumferentially spaced about and depending from said base to engage a lock of hair against displacement from said body member recess.

5. In a hair curler, a spool-shape body member of greater diameter than length having an axial cylindrical bore extending therethrough and an annular peripheral recess located approximately on the transverse center line of the body member, a locking cap telescopically engageable over either end of said body member comprising a base engaging one end of said body member, a cylindrical stem member depending from said base for snug frictional engagement within either end of said bore, one of said members being formed of resilient material and slotted to conform to the diameter of the other member during assembly of the locking cap on the body member, and a plurality of fingers circumferentially spaced about and depending from said base to engage a lock of hair against displacement from said body member recess, said fingers extending across said recess and terminating substantially in a common plane with the adjacent end of said body member.

6. In a hair curler, a spool-shape body member of greater diameter than length having an axial cylindrical bore extending therethrough and an annular peripheral recess located approximately on the transverse center line of the body member, a locking cap telescopically engageable over either end of said body member comprising a base engaging one end of said body member, a cylindrical stem member depending from said base for snug frictional engagement within either end of said bore, one of said members being formed of resilient material and slotted to conform to the diameter of the other member during assembly of the locking cap on the body member, and a plurality of fingers circumferentially spaced about and depending from said base to engage a lock of hair against displacement from said body member recess, said fingers extending across said recess and terminating substantially in a common plane with the adjacent end of said body member, said stem member extending through said bore and terminating in spaced relation to said plane.

References Cited in the file of this patent

UNITED STATES PATENTS

| Number | Name | Date |
|---|---|---|
| 1,982,948 | Binder | Dec. 4, 1934 |
| 2,042,397 | High | May 26, 1936 |
| 2,102,286 | Schmitt | Dec. 14, 1937 |
| 2,107,348 | Solomon | Feb. 8, 1938 |
| 2,270,618 | Bowyer | Jan. 20, 1942 |
| 2,388,628 | Wormington | Nov. 6, 1945 |
| 2,432,585 | Pohl | Dec. 16, 1947 |
| 2,584,760 | Swenson | Feb. 5, 1952 |

FOREIGN PATENTS

| Number | Country | Date |
|---|---|---|
| 686,668 | France | Apr. 15, 1930 |